UNITED STATES PATENT OFFICE.

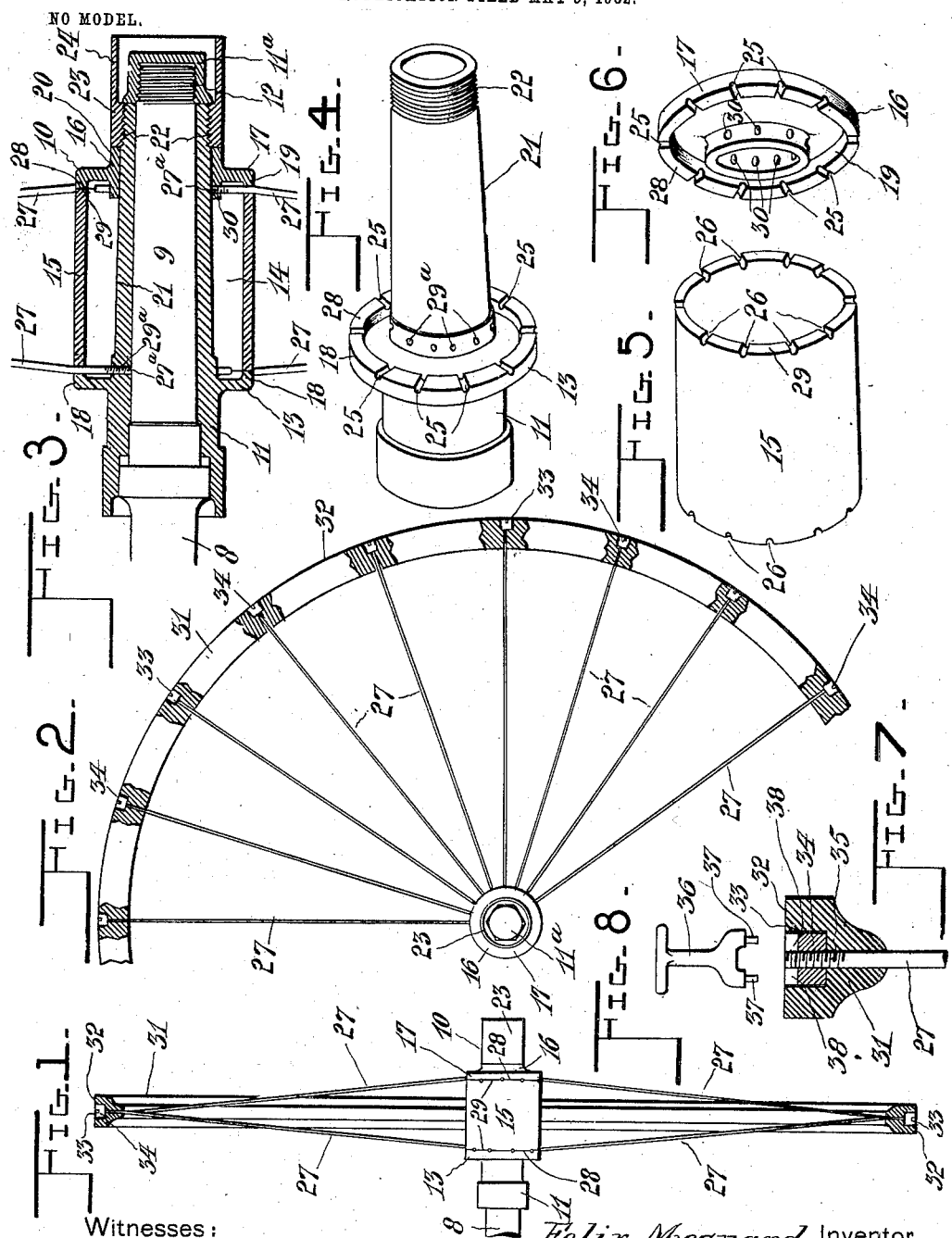

FELIX MESNARD, OF NEW GLASGOW, CANADA.

VEHICLE-WHEEL.

SPECIFICATION forming part of Letters Patent No. 726,557, dated April 28, 1903.

Application filed May 5, 1902. Serial No. 106,030. (No model.)

*To all whom it may concern:*

Be it known that I, FELIX MESNARD, manufacturer of church furniture, of New Glasgow, county of Terrebonne, Province of Quebec, Dominion of Canada, have invented certain new and useful Improvements in Vehicle-Wheels; and I declare that the following is a clear, exact, and complete description of same.

My invention relates to an improved suspension-wheel for vehicles.

The object of my invention is to improve the mode of attachment of the spokes to the hub and rim of the wheel and to provide a wheel having a combination felly and tire—that is to say, the rim of the wheel is formed to act as a tire in itself.

Another object of my invention is to provide the hub of the wheel with separable parts and with a divided external cylindrical portion which holds the spokes at their base above the point at which they are threaded into the body of the hub, and thereby prevents any lateral or bending strain coming upon the point at which they are screwed into the hub, which said strain is extremely apt in ordinary wheels to break the spokes at this point, where they are reduced in section, owing to the screw-threads, and especially as fracture at this point is superinduced by the continual bending back and forth to a slight extent of the spokes, due to the lateral thrust of the axle.

To these ends my invention consists, substantially, in a wheel having a built-up hub of separate pieces, in the body of which are formed radial screw-sockets which receive the threaded ends of the spokes, and external to this body portion of the hub I provide, surrounding the base of the spokes and at a suitable distance from the threaded ends thereof, a cylindrical boxing which holds the base portions of the spoke above said cylindrical ends. This boxing, for the purpose of securely and tightly clamping the spoke and likewise to enable the upset threaded end to be inserted and screwed into its socket, is divided at each side on the two planes at which the spokes meet the hub, whereby the parts of said cylindrical boxing are adapted to be joined together after the spokes are in place, a screw-threaded sleeve or nut being arranged to engage over the tapered end of the hub for this purpose, and, furthermore, this screw-threaded end or nut is adapted to form a dust-shield for the hub-nut proper on the end of the axle.

My invention further consists in providing a steel felly or rim having a flat or cylindrical outer periphery which is adapted to dispense with the tire in use for the wheels heretofore made and providing radial apertures through this felly through which the ends of the spokes pass, these ends being likewise screw-threaded for the reception of a series of nuts, which are seated in sockets or recesses formed around the outer periphery of the felly and which may be turned up into place to tighten the spokes by a suitable stud-wrench.

My invention further consists in the improved construction and combination of parts hereinafter described, and more particularly set forth in the claims.

I have shown the preferred form of my suspension-wheel in the accompanying drawings, wherein—

Figure 1 is a transverse central section through the wheel, showing the hub in elevation. Fig. 2 is a fragmentary side view of the wheel, parts of the felly being shown in section. Fig. 3 is a longitudinal central section through the hub. Fig. 4 is a perspective view of the body-piece of the hub. Figs. 5 and 6 are similar views showing the separate pieces of the cylindrical boxing. Fig. 7 is a fragmentary detail showing a transverse section of the felly, taken through the center of a spoke and showing the latter in elevation; and Fig. 8 is a side elevation of the wrench employed to tighten the spokes.

The same numerals of reference denote like parts in all the figures of the drawings.

The axle of the vehicle is denoted by the numeral 8, and the end of the axle or axle-arm is denoted by 9, and the hub of the wheel as a whole is denoted by 10. This hub is not integral, but is made up of several pieces, as shown in Fig. 3 and as illustrated in detail in Figs. 4, 5, and 6. The hub-body 11 is of the usual or any preferable type—that is to say, in the nature of a sleeve turning loosely on the axle-arm 9 and formed with internal bearing-surfaces, this sleeve being maintained in position on the axle-arm by a hub-nut 11$^a$, fitted over the screw-threaded end 12 of the axle.

The exterior surface of the hub-body 11 is provided near the inner end with a radial flange-lug 13, which forms the end of a cylindrical boxing 14, made up of two other pieces—that is to say, a cylindrical peripheral piece 15 and a second end piece 16, having a peripheral lug 17, formed similarly to the lug 13, but oppositely disposed thereto—that is to say, each of the lugs 13 and 17 has a parallel-facing annular subflange 18 and 19, which form continuations of the cylindrical portion 15 of the boxing, as shown in Fig. 3. The base portion of the end piece 16 comprises a ring-collar 20, which is slightly tapered on its inner surface, as shown, so as to coöperate with the tapered outer surface 21 of the hub-body 11, and the end of this hub-body is also provided with an exterior thread 22, with which engages the annular nut 23, which is screwed thereover in order to force the parts 15 and 16 of the cylindrical boxing up on the hub-sleeve into close engagement with the flange-lug 13 of the latter. The annular end 23 is also provided with an outwardly-extending dust-guard and protector 24, which covers or shields the hub-nut 11ª.

Each of the subflanges 18 and 19 is provided on its radial surface, as shown, with radial semicylindrical grooves 25 in position and of the size to grasp the spokes and permit them to lie therein, these grooves coöperating with similar semicylindrical grooves 26, formed on the opposing edges of the cylindrical piece 15, so that when the parts of the boxing are together there are a series of cylindrical passage-ways for the base ends of the spokes 27 to permit them to pass therethrough; but the opposing faces or edges 28 and 29 of the parts 13, 15, and 16 should be planed sufficiently to permit the spokes to be tightly grasped in these grooves. The inner end of the spokes is threaded, as shown at 27ª, and being divided into two portions, as usual in this type of wheel, separated from each other by a certain axial distance on the hub, the respective series are threaded into screw-threaded sockets 29ª, formed in the hub-sleeve 11 itself and in the inner portion of the ring-collar 20 of the piece 16, as shown at 30.

The outer ends of the spokes are secured in the felly 31 in the manner shown in Figs. 2 and 7. This felly is formed with a cylindrical periphery 32, which forms the tread of the wheel, and it is provided with a series of radial apertures, through which the spokes pass, these apertures extending right through the felly and ending at the tread. Opposite the end of these apertures the tread is recessed, as shown at 33, to a sufficient extent to permit the insertion of the spoke-nut 34, which is screwed over the threaded end 35 of each spoke and may be screwed into position by a wrench 36 of the form shown in Fig. 8, which has two depending pegs or studs 37, adapted to be seated in parallel apertures 38 in the spoke-nut. As shown in Fig. 7, the recess 33 is of sufficient depth to completely admit the nut 34 and to permit it to lie below the surface of the tread to a slight extent, whereby the threaded end 35 of the spoke may be brought completely through the nut without extending beyond the surface of the tread.

In setting up the wheel the spokes are first screwed into their respective sockets 29ª and 30 in the hub 11 and end piece 16 of the cylindrical boxing, respectively, after which the parts of the boxing are put together and clamped up into position by means of the annular nut 23. The spokes may be next inserted through the holes in the felly 31 and properly adjusted by means of the nuts 34 through the medium of the wrench 36.

From the above description it will be evident that my wheel presents many advantages over former wheels, especially in the ways heretofore pointed out—that is to say, preventing breakage of the spokes at the hub, which is very common, and likewise avoiding the use of an independent tire, and providing a wheel whose spokes may be radially tightened when they become loose without the necessity of removing any tire or using what is called a "spoke-wrench" to grasp the body of the spoke. The body portions of the spoke are furthermore so firmly clamped in the cylindrical boxing 14 of the hub that they cannot under ordinary circumstances become unscrewed.

While I have shown in the accompanying drawings the preferred form of my invention, it will be understood that I do not limit myself to the precise form shown, for many of the details may be changed in form or position without affecting the operativeness or utility of my invention, and I therefore reserve the right to make such modifications as are included in the scope of the following claims.

Having thus described my invention, what I claim as new, and desire to secure by Letters Patent, is—

1. A wheel-hub comprising an inner sleeve having a flange with a lateral face, an end piece having a lateral face disposed oppositely to the said first face, a cylindrical outer sleeve of enlarged diameter lying between said faces and coöperating therewith to form peripheral joints, and spokes, the inner extremities whereof pass through said joints and are mounted in said inner sleeve, the inner extremities of said spokes lying substantially in planes at right angles to the axis of said inner sleeve, said spokes being bent so as to converge from a point beyond said outer sleeve.

2. A hub for a vehicle-wheel comprising a hub-sleeve having a bearing upon the axle-arm and a radial flange-lug projecting from its outer side at the inner side of the wheel, said flange-lug having also an outwardly-directed cylindrical subflange having radial grooves in the face thereof, a cylindrical piece having radial grooves on its inner edge coöperating with said first-named grooves and other radial grooves on its outer edge alternating with the grooves on the inner edge around the circumference, an end piece 16 having a ring-collar with a tapered inner face adapted to coöperate with and fit tightly on the outer tapered surface of the hub and having also an annular flange-lug and a cylindrical subflange projecting from the periphery thereof and coacting with said cylindrical piece and having likewise radial grooves therein corresponding to the radial grooves formed in the opposing face of the cylindrical piece, screw-sockets formed opposite each set of radial grooves to receive the ends of the spokes and in the hub-sleeve and end piece 16 respectively, and an annular nut adapted to fit over and engage with the screw-threaded end of the hub-sleeve and having an outwardly-projecting shield and guard covering the hub-nut on the end of the axle.

Montreal, May 1, 1902.

FELIX MESNARD.

Witnesses:
A. LECAVALIER,
A. CHRÉTIEN.